(12) United States Patent
Sen

(10) Patent No.: US 6,265,697 B1
(45) Date of Patent: Jul. 24, 2001

(54) ROTISSERIE OVEN WITH ORBITING SPIT DRIVE GEAR

(76) Inventor: Su Yung Sen, PO Box 82-144, Taipei (TW)

( * ) Notice: Subject to any disclaimer, the term of this patent is extended or adjusted under 35 U.S.C. 154(b) by 0 days.

(21) Appl. No.: 09/609,869

(22) Filed: Jul. 3, 2000

(51) Int. Cl.[7] .............................. A21B 1/44; F27B 9/16; F27D 3/12
(52) U.S. Cl. .................... 219/392; 219/388; 99/421 H; 126/388
(58) Field of Search .................... 219/388, 385, 219/386, 392, 753, 393; 99/421 H, 421 P; 126/388

(56) References Cited

U.S. PATENT DOCUMENTS

| | | | |
|---|---|---|---|
| 1,838,545 | * 12/1931 | Guffey | 99/421 P |
| 3,309,982 | * 3/1967 | Surks | 99/421 P |
| 4,286,133 | * 8/1981 | Einset et al. | 219/753 |
| 4,717,802 | * 1/1988 | Colato | 99/421 HV |
| 5,837,980 | * 11/1998 | Henning | 219/753 |
| 5,908,576 | * 6/1999 | Henning | 219/753 |

\* cited by examiner

*Primary Examiner*—Joseph Pelham
(74) *Attorney, Agent, or Firm*—A & J

(57) ABSTRACT

An oven includes a bowl-shaped body having an upper portion pivotally connected with a lid, an electric motor installed on an inner bottom of the bowl-shaped body and having a vertical output axle having upper end formed with a square head, a tray having a central portion formed with a protruded square member which has a square recess at a bottom configured to engage with the square head of the output axle of the electric motor, an annular ring-like member provided with a plurality of rollers and mounted under the tray for facilitating rotation of the tray, a skewer provided with a first gear fixedly mounted at one end thereof, and a second gear freely rotatably mounted at another end thereof, a first groove having a small distance from an inner side of the first gear and sized to engage with the U-shaped slot of the L-shaped lugs, and a second groove having a small distance from an inner side of the second gear and sized to engage with the U-shaped slot of the L-shaped lug, the skewer having a round portion adapted to engage with the second gear so as to enable the second gear to rotate freely with respect to the skewer, an outermost end of the skewer being engaged with a first nut, while another outermost end of the skewer being sharpened to hold foods and formed with threads adapted to engage with a second nut for preventing the second gear from disengaging from the skewer.

4 Claims, 7 Drawing Sheets

ROTISSERIE OVEN WITH ORBITING SPIT DRIVE GEAR

BACKGROUND OF THE INVENTION

1. Field of the Invention

This invention is related to an improvement in the structure of an oven and in particular to one which can roast food evenly.

2. Description of the Prior Art

The conventional oven (see FIG. 1) generally includes a housing 10, a rack 20, and a tray 30, wherein the housing 10 is provided with two rails 11 at its two opposite sides each having a longitudinal groove. A heater is arranged into the housing 10 for heating the food therein. The rack 20 is designed for receiving foods and slidably inserted into the longitudinal grooves of the two rails 11 so that the rack 20 can be pulled out or pushed into the housing 10 as required. The tray 30 is disposed within the housing 10 for receiving foods and located under the rack 20.

Since the rack 20 is kept stationary when mounted inside the housing 10, the distances between various portions of the food on the rack 20 will be different thereby causing the food to be heated unevenly and therefore making the food burn in some parts but remain uncooked in the other parts.

Therefore, it is an object of the present invention to provide an improvement in the structure of an oven which can obviate and mitigate the above-mentioned drawbacks.

SUMMARY OF THE INVENTION

This invention is related to an improvement in the structure of an oven.

It is the primary object of the present invention to provide an improvement in the structure of an oven which can roast food evenly.

It is another object of the present invention to provide an improvement in the structure of an oven which can prevent food from burning.

It is a further object of the present invention to provide an improvement in the structure of an oven having a tray which can be folded when not in use.

According to the present invention, an oven includes a bowl-shaped body having an upper portion pivotally connected with a lid, an electric motor installed on an inner bottom of the bowl-shaped body and having a vertical output axle having upper end formed with a square head, a tray having a central portion formed with a protruded square member which has a square recess at a bottom configured to engage with the square head of the output axle of the electric motor, an annular ring-like member provided with a plurality of rollers and mounted under the tray for facilitating rotation of the tray, a skewer provided with a first gear fixedly mounted at one end thereof, and a second gear freely rotatably mounted at another end thereof a first groove having a small distance from an inner side of the first gear and sized to engage with the U-shaped slot of the L-shaped lugs, and a second groove having a small distance from an inner side of the second gear and sized to engage with the U-shaped slot of the L-shaped lug, the skewer having a round portion adapted to engage with the second gear so as to enable the second gear to rotate freely with respect to the skewer, an outermost end of the skewer being engaged with a first nut, while another outermost end of the skewer being sharpened to hold foods and formed with threads adapted to engage with a second nut for preventing the second gear from disengaging from the skewer.

The foregoing objects and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts. Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENT

Figure 1:
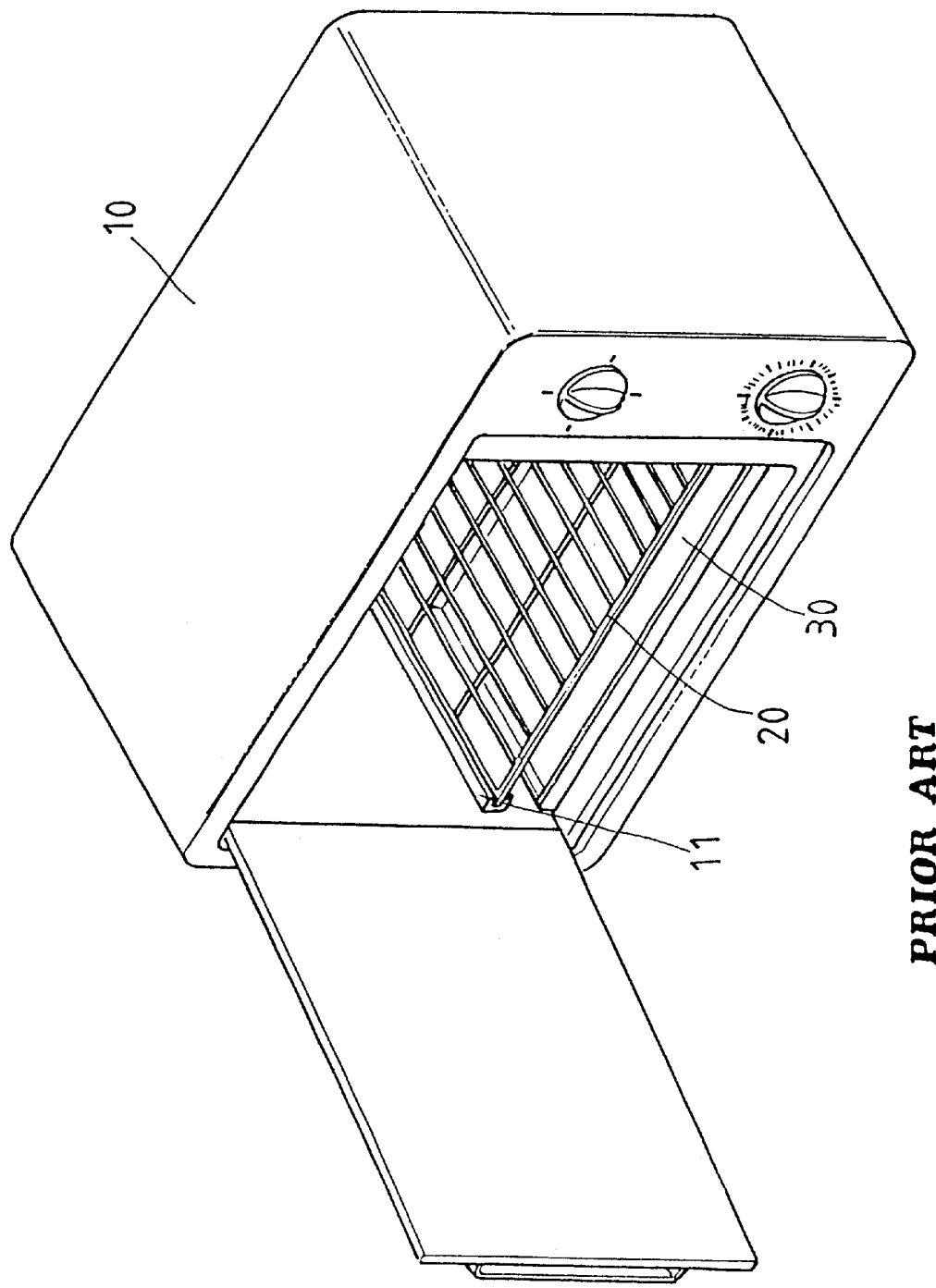
FIG. 1 is a perspective view of a prior art oven.

For the purpose of promoting an understanding of the principles of the invention, reference will now be made to the embodiment illustrated in the drawings. Specific language will be used to describe same. It will, nevertheless, be understood that no limitation of the scope of the invention is thereby intended, such alterations and further modifications in the illustrated device, and such further applications of the principles of the invention as illustrated herein being contemplated as would normally occur to one skilled in the art to which the invention relates.

Figure 2:
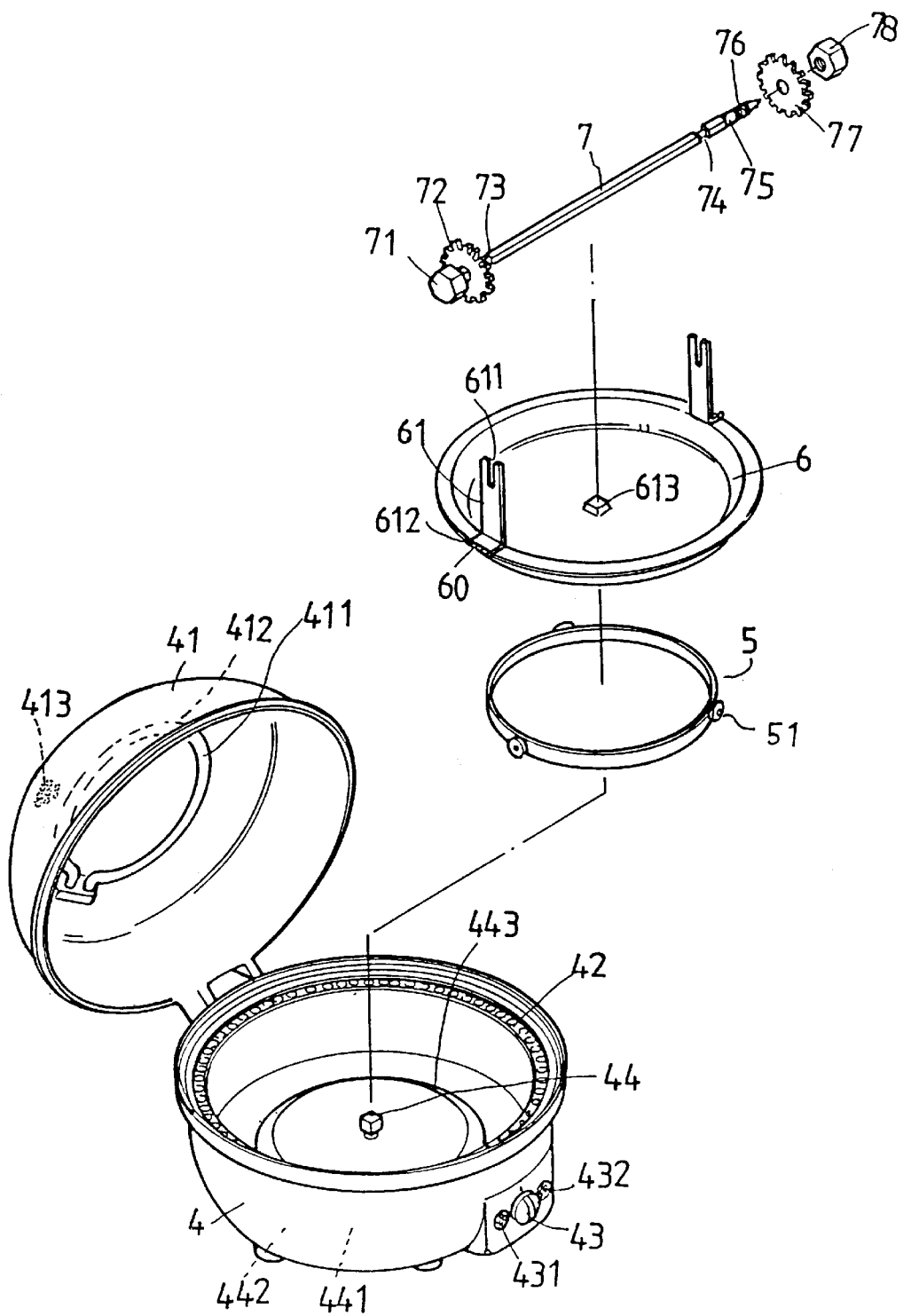
FIG. 2 is an exploded view of the present invention.
Figure 3:
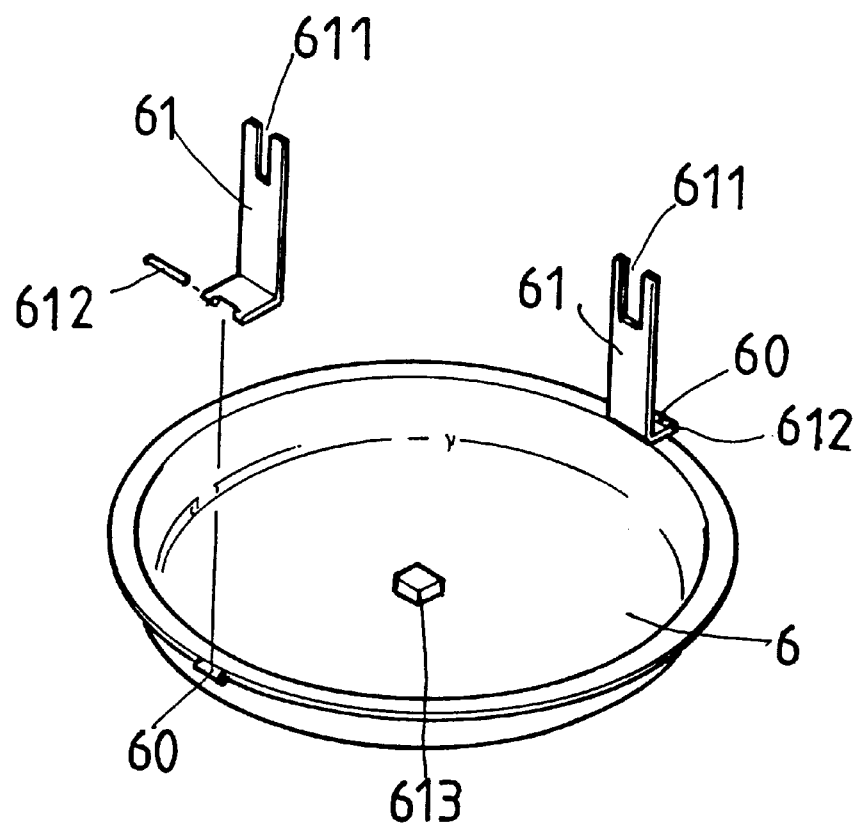
FIG. 3 is a perspective view of the tray.
Figure 4:
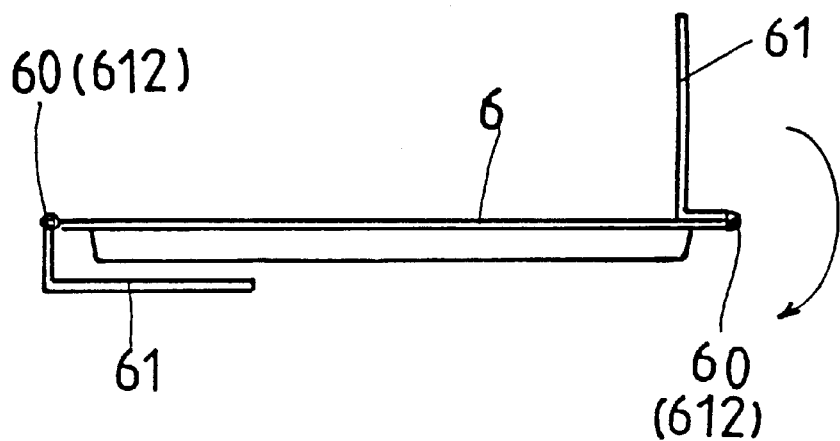
FIG. 4 is a side view of the tray.
Figure 7:
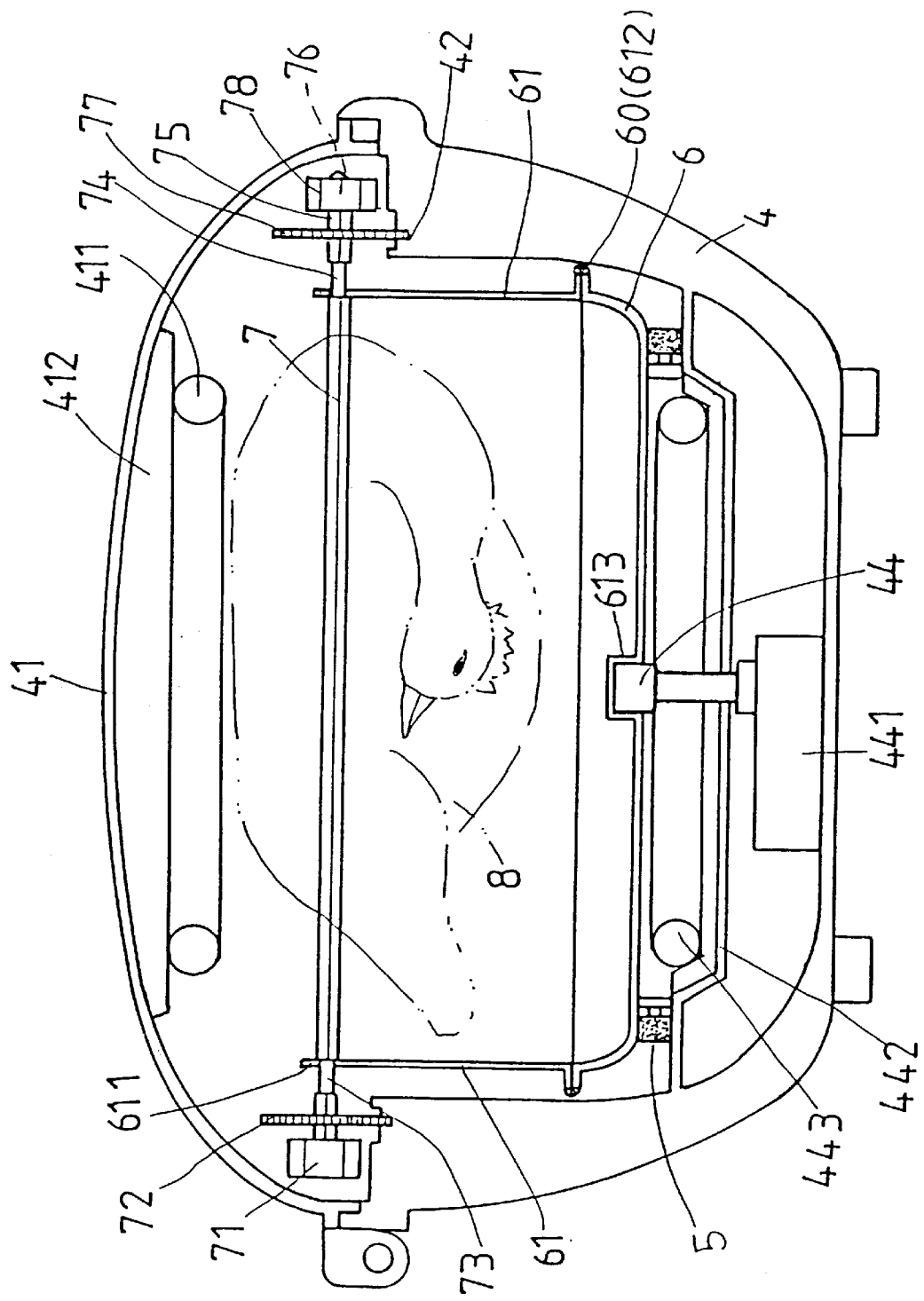
FIGS. 7 and 8 illustrate the working principle of the present invention.
Figure 8:
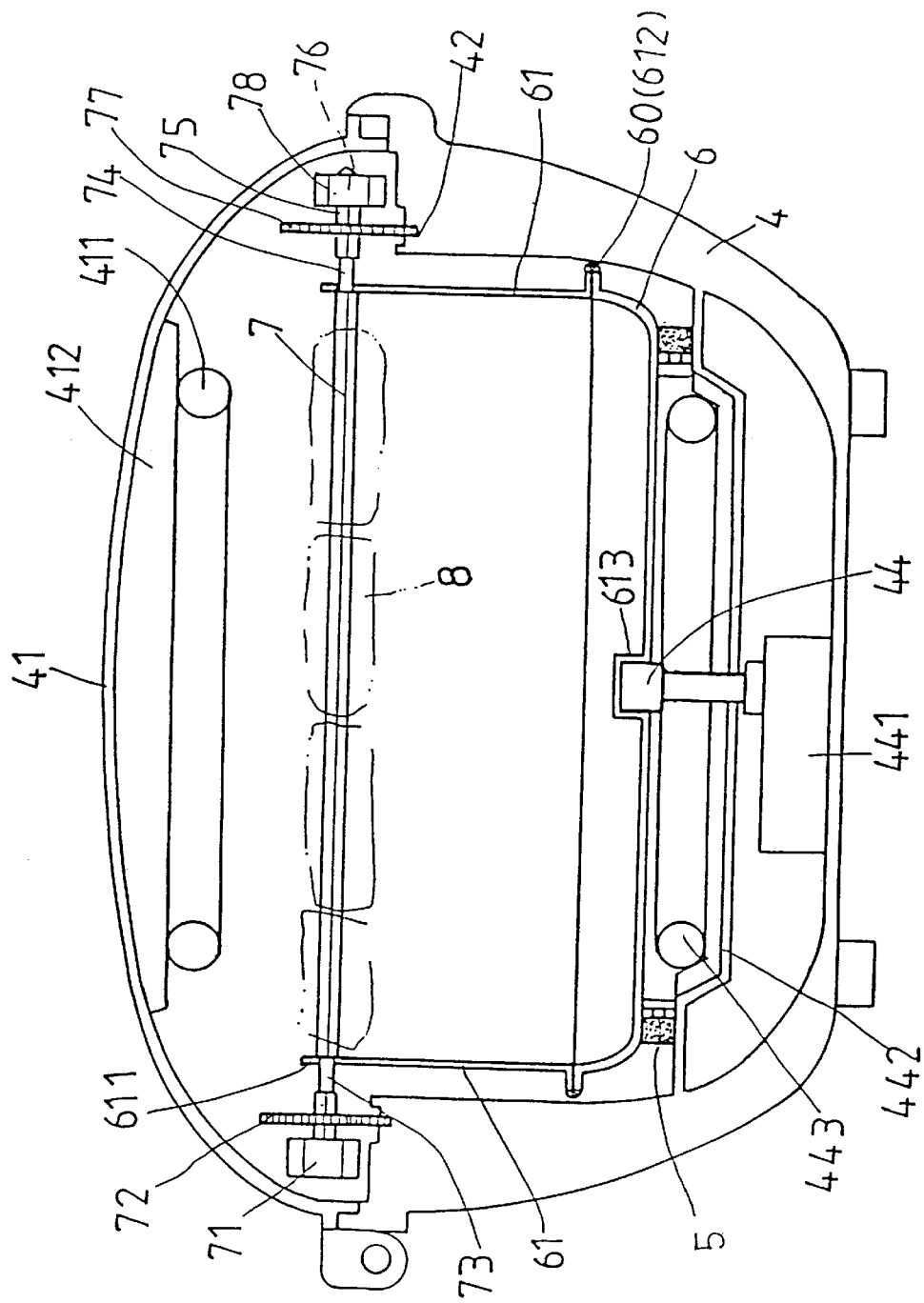

With reference to the drawings and in particular to FIGS. 2, 3 and 4 thereof, the multi-function oven according to the present invention generally comprises a bowl-shaped body 4, an annular ring-like member 5, a tray 6 and a skewer 7. A lid 41 is pivotally connected with an upper portion of the bowl-shaped body 4 for closing the housing 4 in cooking. The inner top of the lid 41 is provided with a plurality of ventilation holes 413, a heat-resistant member 412 and an electric heater 411 mounted on the heat-resistant member 412. The upper portion of the bowl-shaped body 4 is provided with a plurality of teeth 42 around the circumference thereof. An electric motor 411 is installed on the bottom of the bowl-shaped body 2 (see FIGS. 7 and 8) and has a vertical output axle formed at the upper end with a square head 44. A heat-resistant member 442 is mounted above the electric motor 441, on which is mounted an electric heater 443. The front side of the bowl-shaped body 2 is provided with two indicating lights 431 and 432 and a timer 43.

The tray 6 has a central portion formed with a protruded square member 613 which has a square recess at the bottom configured to engage with the square head 44 of the output axle of the electric motor 441 so that when the electric motor 441 is turned on, the tray 6 will be rotated. The tray 6 is provided with two projections 60 at two opposite sides thereof, each pivotally connected with an L-shaped lug 61 by a pin 612 so that the L-shaped lug 6 can be turned up on the tray 6 in use or down under the tray when not in use. The L-shaped lug 61 is formed with a U-shaped slot 611 for receiving the skewer. The annular ring-like member 5 is provided with a plurality of rollers 51 and mounted under the tray 5 for facilitating the rotation of the tray 5.

The skewer 7 is an elongated rod with a polygonal cross section and provided with a first gear 72 fixedly mounted at one end thereof, and a freely rotated gear 77 at the other, a first groove 73 having a small distance from an inner side of the first gear 72 and sized to engage with the U-shaped slot 611 of the L-shaped lug 61, and a second groove 74 having a small distance from an inner side of the freely rotatable gear 77 and sized to engage with the U-shaped slot 611 of the L-shaped lug 61. The skewer 7 has a round portion adapted to engage with the gear 77 so as to enable the gear 77 to rotate freely with respect to the skewer 7. An outermost end of the skewer 7 is engaged with a nut 71, while the other outermost end of the skewer 7 is sharpened to hold foods and formed with threads 76 adapted to engage with a nut 78 for preventing the gear 77 from disengaging from the skewer 7.

Figure 5:
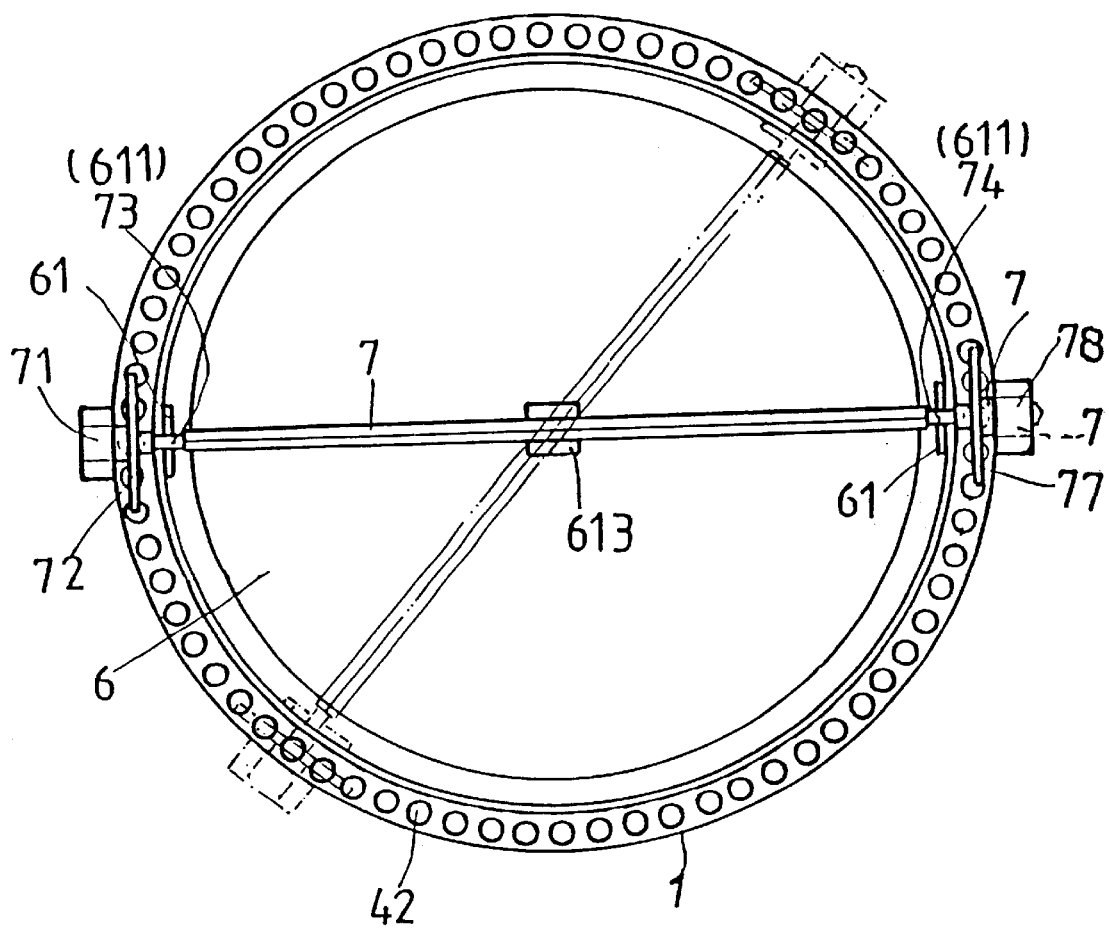
FIG. 5 is a top view illustrating the structure of the teeth of the bowl-shaped body.
Figure 6:
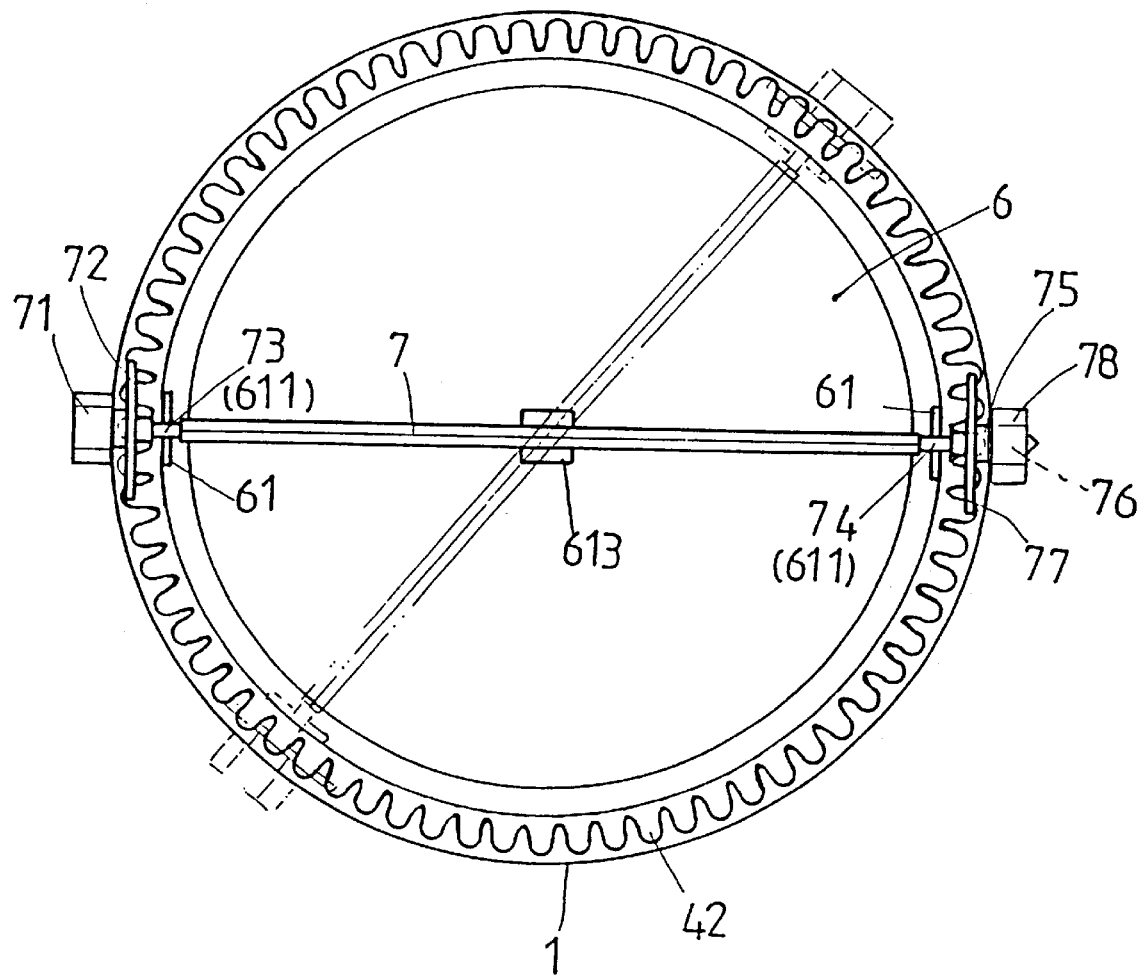
FIG. 6 is a top view showing another preferred embodiment of the teeth of the bowl-shaped body.

Referring to FIGS. 5, 6,7 and 8, when the skewer 7 mounted on the lugs 61 of the tray 6, the gears 72 and 77 of the skewer 7 will be meshed with teeth 42 of the bowl-shaped body 4. FIGS. 5 and 6 illustrate two preferred embodiment of the teeth 42 of the bowl-shaped body 4, wherein the teeth 42 shown in FIG. 5 are circular in shape while the teeth 42 shown in FIG. 6 protrude out from the edge.

When the electric motor 441 is turned on, the square head 44 of the output axle of the electric motor 441 will drive the tray 6 to rotate via the engagement between the square head 44 and the square recess at the bottom of the protruded square member 613 of the tray 6. In the meantime, the gear 71 will be rotated along the upper portion of the bowl-shaped body 4 thereby rotating the skewer 7. Accordingly, the tray 6 and the skewer 7 will be rotated simultaneously thereby rotating the food on the skewer 7 evenly when the electric motor 441 is turned on. When the food is well done, it is only necessary to take up the skewer 7 from the lugs 61 and get the food therefrom.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the spirit of the present invention.

I claim:

1. An oven comprising:

a bowl-shaped body having an upper portion pivotally connected with a lid, an inner top of said lid being provided with a plurality of ventilation holes, a first heat-resistant member and a first electric heater mounted on said heat-resistant member, an upper portion of said bowl-shaped body being provided with a plurality of teeth around a circumference thereof;

an electric motor installed on an inner bottom of said bowl-shaped body and having a vertical output axle having upper end formed with a square head, a first heat-resistant member mounted said electric motor on which is mounted a second electric heater;

a tray having a central portion formed with a protruded square member which has a square recess at a bottom configured to engage with said square head of said output axle of said electric motor so that when said electric motor is turned on, said tray will be rotated, said tray being provided with two projections at two opposite sides thereof pivotally connected with two L-shaped lugs to enable said L-shaped lugs to be turned up on said tray in use or down under said tray when not in use, said L-shaped lugs being formed with a U-shaped slot at an upper end thereof;

an annular ring-like member provided with a plurality of rollers and mounted under said tray for facilitating rotation of said tray;

a skewer provided with a first gear fixedly mounted at one end thereof, and a second gear freely rotatably mounted at another end thereof, a first groove having a small distance from an inner side of said first gear and sized to engage with said U-shaped slot of the L-shaped lugs, and a second groove having a small distance from an inner side of said second gear and sized to engage with said U-shaped slot of said L-shaped lug, said skewer having a round portion adapted to engage with said second gear so as to enable said second gear to rotate freely with respect to said skewer, an outermost end of said skewer being engaged with a first nut, while another outermost end of said skewer being sharpened to hold foods and formed with threads adapted to engage with a second nut for preventing said second gear from disengaging from said skewer.

2. The oven as claimed in claim 1, wherein said skewer is an elongated rod with a polygonal cross section.

3. The oven as claimed in claim 1, wherein said teeth of said bowl-shaped body is circular in shape.

4. The oven as claimed in claim 1, wherein said teeth of said bowl-shaped body protrude out from an edge of said bowl-shaped body.

\* \* \* \* \*